(12) United States Patent
Tilden

(10) Patent No.: US 8,661,928 B1
(45) Date of Patent: Mar. 4, 2014

(54) METHOD AND SYSTEM FOR ARTICULATING THE UPPER LIMBS OF A HUMANOID

(75) Inventor: Mark Woodruff Tilden, TST East (HK)

(73) Assignee: Wowwee Group Limited, Kowloon (HK)

( * ) Notice: Subject to any disclaimer, the term of this patent is extended or adjusted under 35 U.S.C. 154(b) by 1293 days.

(21) Appl. No.: 12/488,344

(22) Filed: Jun. 19, 2009

Related U.S. Application Data

(60) Provisional application No. 61/074,461, filed on Jun. 20, 2008.

(51) Int. Cl.
  *B25J 17/00* (2006.01)
  *B25J 17/02* (2006.01)
  *B25J 18/00* (2006.01)

(52) U.S. Cl.
  USPC ............................. 74/490.05; 901/27; 901/28

(58) Field of Classification Search
  USPC ........... 74/490.01, 490.05; 901/15, 19, 27, 28
  See application file for complete search history.

(56) References Cited

U.S. PATENT DOCUMENTS

| | | | |
|---|---|---|---|
| 4,282,677 A | 8/1981 | Abe | |
| 5,157,316 A | 10/1992 | Glovier | |
| 6,583,595 B1 | 6/2003 | Hattori et al. | |
| 6,732,015 B2 * | 5/2004 | Maeda | 700/245 |
| 6,999,851 B2 * | 2/2006 | Kato et al. | 700/245 |
| 7,113,849 B2 * | 9/2006 | Kuroki et al. | 700/245 |
| 7,615,956 B2 * | 11/2009 | Tsusaka | 318/568.11 |
| 2010/0243344 A1 * | 9/2010 | Wyrobek et al. | 180/21 |
| 2011/0067521 A1 * | 3/2011 | Linn et al. | 74/490.06 |
| 2012/0059515 A1 * | 3/2012 | Abdallah et al. | 700/255 |
| 2012/0061155 A1 * | 3/2012 | Berger et al. | 180/21 |
| 2012/0232698 A1 * | 9/2012 | Koga et al. | 700/261 |

* cited by examiner

*Primary Examiner* — Justin Krause

(74) *Attorney, Agent, or Firm* — Merchant & Gould P.C.

(57) ABSTRACT

A mechanism for articulating a right arm, a left arm, a right forearm, and a left forearm of a humanoid, the arms are coupled with a torso of the humanoid by humeroscapular joints. Each of the forearms is coupled with a humerus of the respective arm, by a respective proximal radioulnar joint. The mechanism includes a first transmission, a second transmission, a first actuator, a second actuator, and a controller. The first actuator is coupled with the right humeroscapular joint and with the left proximal radioulnar joint via the first transmission. The second actuator is coupled with the left humeroscapular joint and with the right proximal radioulnar joint via the second transmission, the controller controlling the movements of each of the first actuator and of the second actuator.

7 Claims, 15 Drawing Sheets

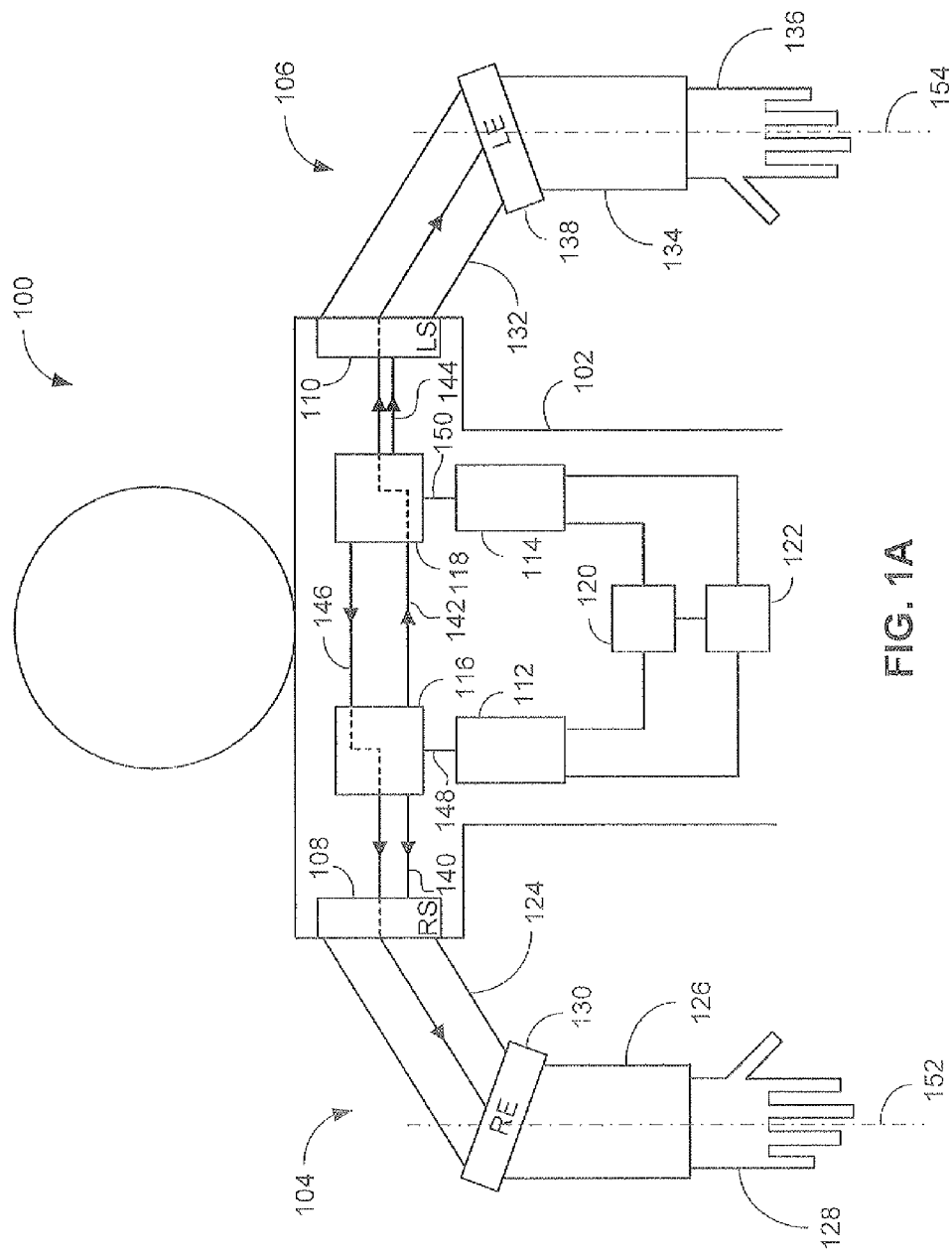

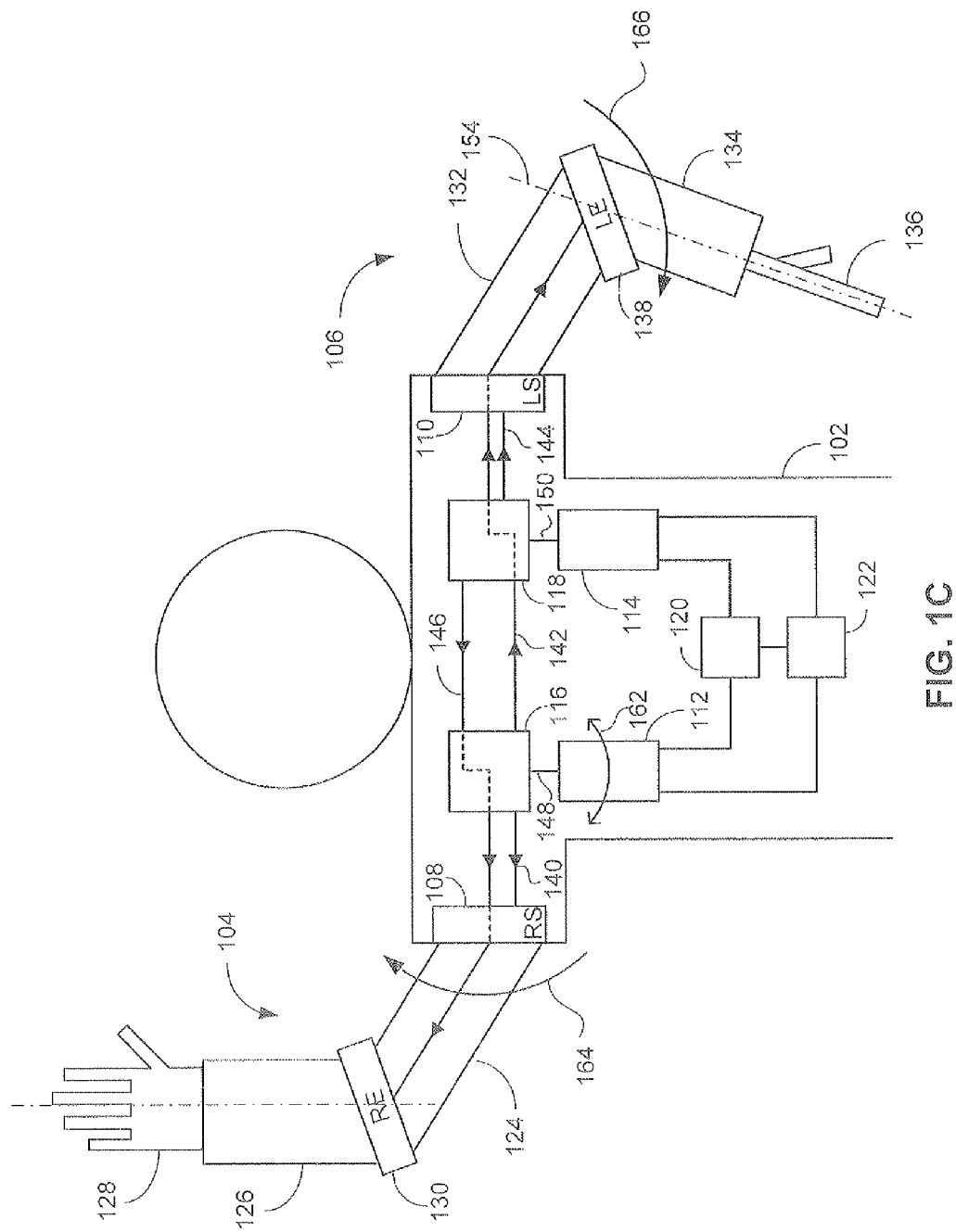

METHOD AND SYSTEM FOR ARTICULATING THE UPPER LIMBS OF A HUMANOID

This application claims benefit of U.S. Ser. No. 61/074,461, filed 20 Jun. 2008 and which application is incorporated herein by reference. To the extent appropriate, a claim of priority is made to the above disclosed application.

FIELD OF THE DISCLOSED TECHNIQUE

The disclosed technique relates to electromechanical devices in general, and to methods and systems for moving the limbs of a robot, in particular.

BACKGROUND OF THE DISCLOSED TECHNIQUE

Methods and systems for constructing robotic toys are known in the art. Such robotic toys include a plurality of mechanisms, a plurality of electric actuators, a controller, and a power source. The electric actuators actuate the respective mechanism, by drawing power from the power source, and according to commands received from the controller. A variety of mechanisms exist to provide a desirable articulation of the arms, neck, trunk, or the legs of the robotic toy.

U.S. Pat. No. 6,583,595 B1 issued to Hattori et al., and entitled "Robot and Joint Device for the Same", is directed to a humanoid robot. The humanoid robot includes two arms, a head, two legs, and a trunk. The head includes a neck joint yaw axis actuator, a neck joint pitch axis actuator, and a neck joint roll axis actuator. The trunk includes a trunk pitch axis actuator, a trunk roll axis actuator, and a trunk yaw axis actuator. Each of the arms includes a shoulder joint pitch axis actuator, a shoulder joint roll axis actuator, and a shoulder yaw axis actuator. Each of the legs includes a hip joint pitch axis actuator, a hip joint roll axis actuator, and a hip joint yaw axis actuator.

U.S. Pat. No. 5,157,316 issued to Glovier, and entitled "Robotic Joint Movement Device", is directed to a device for moving a robotic limb. The device includes an electronic gear reduced motor, a housing, and a fixed output shaft. The electronic gear reduced motor is located within the housing. The electronic gear reduced motor is connected to the fixed output shaft. The fixed output shaft is connected to a first limb which is stationary relative to a second limb that is dynamic. The fixed output shaft is connected to the first limb. The housing is connected to the second limb. The housing rotates about the fixed output shaft. Rotation of the electronic gear reduced motor rotates the second limb relative to the first limb.

U.S. Pat. No. 4,282,677 issued to Abe, and entitled "Ambulatory Worker Toy" is directed to an oscillatory transmission mechanism of a toy which enables a toy to oscillate sideways while sweeping a floor with a broom, articulating its jaws, and whistling. The oscillatory transmission mechanism includes a chassis, a spring motor, a ratchet element, a key element, a head moving mechanism, a whistle mechanism, an oscillatory element, and a plurality of gears, an eccentric weight, and a plurality of shafts. The head moving mechanism includes a head casing, and a plurality of mounting posts. All the elements and mechanisms are located within the chassis. The oscillatory transmission mechanism couples the spring motor to head moving mechanism. The oscillatory transmission mechanism couples the spring motor to whistle mechanism. The spring motor powers the elements. The key element is connected with the spring motor, through the ratchet element. A user winds up the spring motor by turning the key element. The oscillatory transmission mechanism moves up and down, thereby pivoting the head casing about the mounting posts, to periodically open a mouth of the toy, in synchrony with the whistles emitted from the whistle mechanism.

SUMMARY

In accordance with an embodiment of the disclosed technique, there is thus provided a mechanism for articulating a right arm, a left arm, a right forearm and a left forearm of a humanoid. The right arm is coupled with a torso of the humanoid, by a right humeroscapular joint. The left arm is coupled with the torso, by a left humeroscapular joint. The right forearm is coupled with a right humerus of the right arm, by a right proximal radioulnar joint. The left forearm is coupled with a left humerus of the left arm, by a left proximal radioulnar joint. The right humeroscapular joint provides flexion and extension of the right arm. The left humeroscapular joint provides flexion and extension of the left arm. The right proximal radioulnar joint provides supination and pronation of the right forearm. The left proximal radioulnar joint provides supination and pronation of the left forearm. The mechanism includes a first transmission, a second transmission, a first actuator, a second actuator, a controller and a power supply. Each of the first transmission, the second transmission, the first actuator, the second actuator and the controller is located within the humanoid. The first actuator is coupled with the right humeroscapular joint, and with the left proximal radioulnar joint, via the first transmission. The first actuator extends the right arm while supinating the left forearm. The first actuator flexes the right arm while pronating the left forearm. The second actuator is coupled with the left humeroscapular joint, and with the right proximal radioulnar joint, via the second transmission. The second actuator extends the left arm while supinating the right forearm. The second actuator flexes the left arm while pronating the right forearm. The controller is coupled with the first actuator and with the second actuator. The controller controls the movements of each of the first actuator and of the second actuator. The power supply is coupled with the first actuator, the second actuator, and with the controller. The power supply provides power to the controller, the first actuator, and to the second actuator.

In accordance with another embodiment of the disclosed technique, there is thus provided a mechanism for articulating a right arm, a left arm, a right forearm, and a left forearm of a humanoid. The right arm is coupled with a torso of the humanoid, by a right humeroscapular joint. The left arm is coupled with the torso, by a left humeroscapular joint. The right forearm is coupled with a right humerus of the right arm, by a right proximal radioulnar joint. The left forearm is coupled with a left humerus of the left arm, by a left proximal radioulnar joint. The right humeroscapular joint provides flexion and extension of the right arm. The left humeroscapular joint provides flexion and extension of the left arm. The right proximal radioulnar joint provides supination and pronation of the right forearm. The left proximal radioulnar joint provides supination and pronation of the left forearm. The mechanism includes a first actuator, a second actuator, a third actuator, a fourth actuator, a controller and a power supply. Each of the first actuator, the second actuator, the third actuator, the fourth actuator and the controller is located within the humanoid.

The first actuator is coupled with the right humeroscapular joint. The second actuator is coupled with the left proximal radioulnar joint. The third actuator is coupled with the left humeroscapular joint. The fourth actuator is coupled with the right proximal radioulnar joint. The controller is coupled with the first actuator, the second actuator, the third actuator and with the fourth actuator, for simultaneously operating the first actuator with the second actuator, and for simultaneously operating the third actuator with the fourth actuator. The power supply is coupled with the first actuator, the second actuator, the third actuator and with the fourth actuator. The power supply provides power to the first actuator, the second actuator, the third actuator and to the fourth actuator.

BRIEF DESCRIPTION OF THE DRAWINGS

The disclosed technique will be understood and appreciated more fully from the following detailed description taken in conjunction with the drawings in which:

FIG. 1A is a schematic illustration of an upper portion of a robot with both the right arm and the left arm in flexion, and both the right forearm and the left forearm in pronation, constructed and operative according to an embodiment of the disclosed technique;

FIG. 1C is a schematic illustration of the robot of FIG. 1A with the right arm in extension and the left forearm in pronation;

DETAILED DESCRIPTION OF THE EMBODIMENTS

The disclosed technique overcomes the disadvantages of the prior art by moving the humerus of one of the upper limbs about its humeroscapular joint, while simultaneously moving the radius of the contralateral upper limb, about its proximal radioulnar joint. For example, a motor of a robot simultaneously pronates a right forearm of the robot, and extend a left arm of the robot. Alternatively, the same motor can simultaneously supinate the right forearm, and flex the left arm. Another motor of the robot can simultaneously pronate and supinate the left forearm, and extend and flex the right arm, respectively.

Figure 1B:
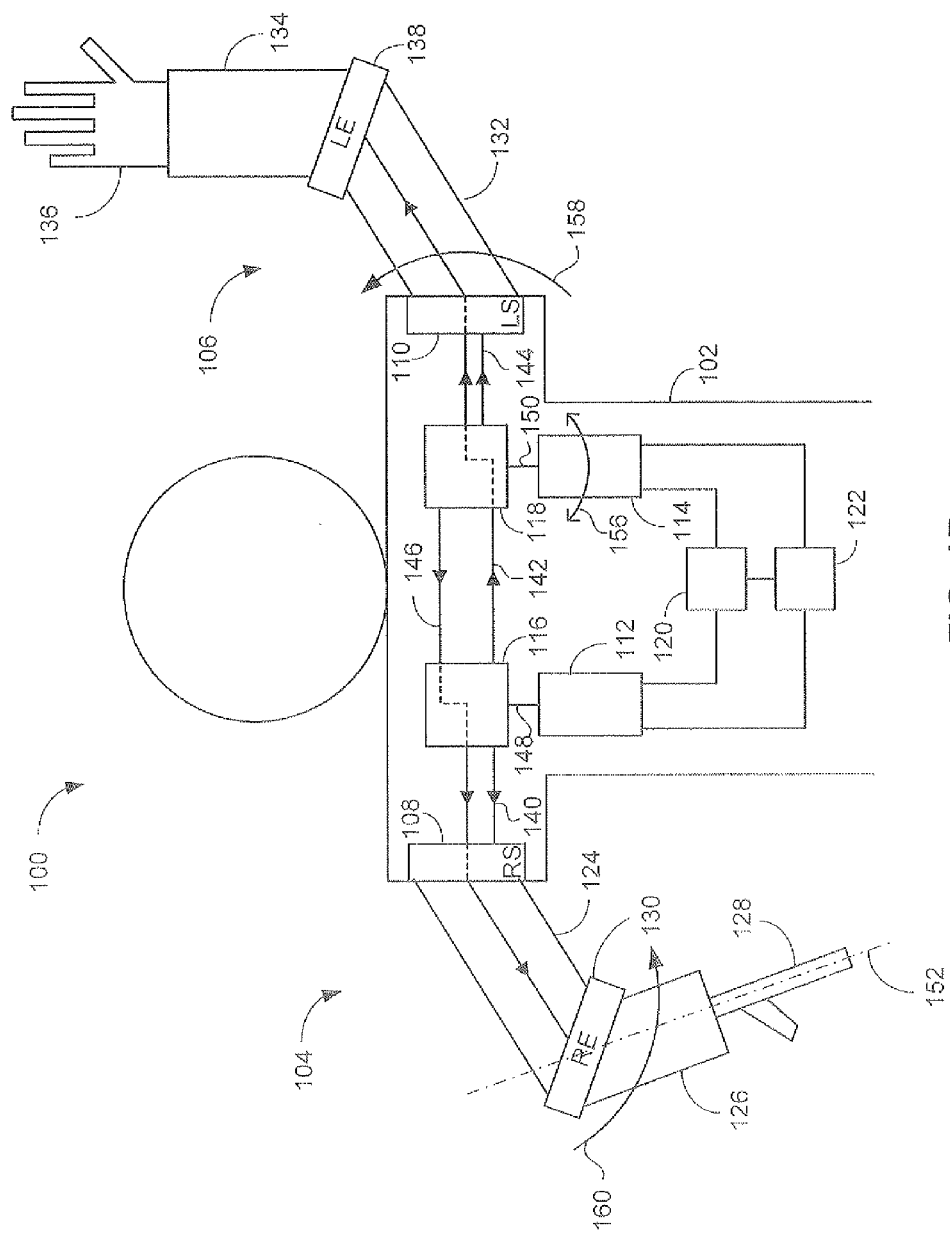
FIG. 1B is a schematic illustration of the robot of FIG. 1A with the left arm in extension, and the right forearm in pronation.
Figure 1D:
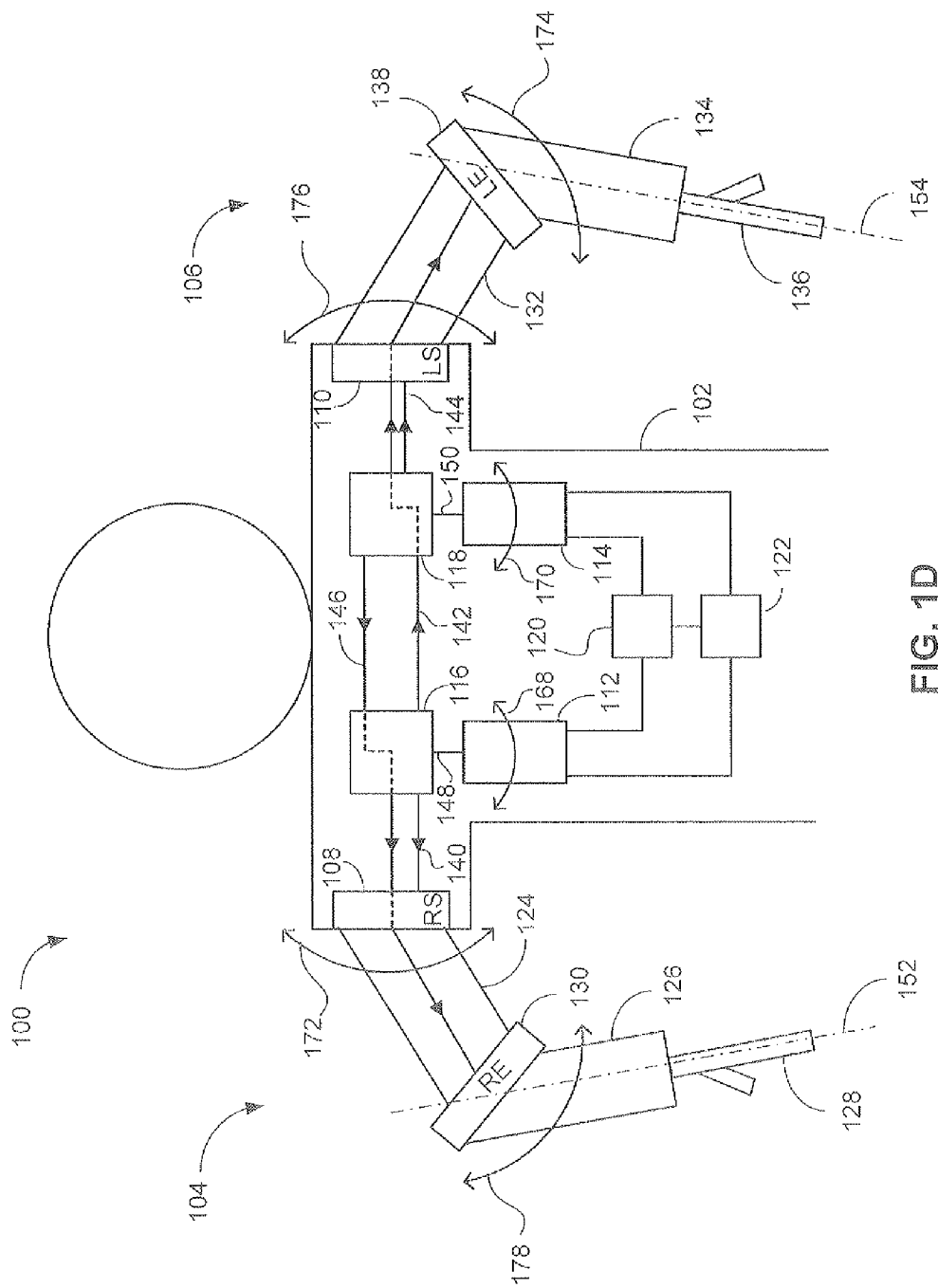
FIG. 1D is a schematic illustration of the robot of FIG. 1A with each of the right arm and the left arm in flexion, and each of the right forearm and the left forearm in supination.

Reference is now made to FIGS. 1A, 1B, 1C and 1D which are schematic illustrations of an upper portion of a robot, generally referenced 100, constructed and operative according to an embodiment of the disclosed technique. FIG. 1A is a schematic illustration of robot 100 with both the right arm and the left arm in flexion, and both the right forearm and the left forearm in pronation. FIG. 1B is a schematic illustration of the robot 100 with the left arm in extension, and the right forearm in supination. FIG. 1C is a schematic illustration of the robot 100 with the right arm in extension and the left forearm in supination. FIG. 1D is a schematic illustration of the robot 100 with each of the right arm and the left arm in flexion, and each of the right forearm and the left forearm in supination.

With reference to FIG. 1A, robot 100 includes a torso 102, a right arm 104, a left arm 106, a right humeroscapular joint 108, a left humeroscapular joint 110, a first motor 112, a second motor 114, a first transmission 116, a second transmission 118, a controller 120, and a power supply 122. Right arm 104 includes a right humerus 124, a right forearm 126, a right hand 128, and a right proximal radioulnar joint 130. Left arm 106 includes a left humerus 132, a left forearm 134, a left hand 136, and a left proximal radioulnar joint 138.

First motor 112 is coupled with right humeroscapular joint 108 by a link 140, via first transmission 116, and with left proximal radioulnar joint 138 by a link 142, via first transmission 116. Second motor 114 is coupled with left humeroscapular joint 110 by a link 144, via second transmission 118, and with right proximal radioulnar joint 130 by a link 146, via second transmission 118. Power supply 122 is coupled with controller 120, first motor 112, and with second motor 114. Controller 120 is coupled with first motor 112 and with second motor 114. Links 140 and 142 are coupled with first motor 112, by a link 148, through first transmission 116. Links 144 and 146 are coupled with second motor 114, by a link 150, through second transmission 118.

Right arm 104 is coupled with torso 102 by right humeroscapular joint 108. Left arm 106 is coupled with torso 102 by left humeroscapular joint 110. Right forearm 126 is coupled with right humerus 124 by right proximal radioulnar joint 130. Left forearm 134 is coupled with left humerus 132 by left proximal radioulnar joint 138. Right hand 128 and left hand 136 are coupled with right forearm 126 and with left forearm 134, respectively.

Each of first motor 112 and second motor 114 is in the form of an actuator which produces a mechanical motion. Each of first motor 112 and second motor 114 can be in form of a rotary electromechanical motor, linear electromechanical motor, hydraulic actuator, pneumatic actuator, and the like. Power supply 122 is in the form of an electrical power source, hydraulic power source, or a pneumatic power source, depending on the type of first motor 112 and second motor 114.

Each of first transmission 116 and second transmission 118 includes a plurality of mechanical parts, such as gears, bearings, shafts, belts, pulleys, and the like. Each of first transmission 116 and second transmission 118 transmits the mechanical motions which first motor 112 and second motor 114, respectively, produce, to respective ones of right humeroscapular joint 108, a left humeroscapular joint 110, right proximal radioulnar joint 130, and left proximal radioulnar joint 138. Furthermore, first transmission 116 may reduce the rate of the mechanical motion transmitted to either of right humeroscapular joint 108 or left proximal radioulnar joint 138. Second transmission 118 may reduce the rate of the mechanical motion transmitted to either of right humeroscapular joint 110 or left proximal radioulnar joint 130.

Right humeroscapular joint 108 is in the form of a hinge which allows right arm 104 to rotate about a first anteroposterior axis (not shown), passing through right humeroscapular joint 108. In this manner, right humeroscapular joint 108 allows right arm 104 to extend and flex. Left humeroscapular joint 110 is in the form of a hinge which allows left arm 106 to rotate about a second anteroposterior axis (not shown), passing through left humeroscapular joint 110. In this manner, left humeroscapular joint 110 allows left arm 106 to extend and flex.

Right proximal radioulnar joint 130 is in the form of a hinge which allows right forearm 126 to rotate about a right longitudinal radioulnar axis 152. In this manner, right proximal radioulnar joint 130 allows right forearm 126 to pronate (i.e., the palm of right hand 128 rotates toward a position facing backward) and supinate (i.e., the palm of right hand 128 rotates toward a position facing forward). Left proximal radioulnar joint 138 is in the form of a hinge which allows left forearm 134 to rotate about a left longitudinal radioulnar axis 154. In this manner, left proximal radioulnar joint 138 allows left forearm 134 to pronate and supinate.

Controller 120 is in the form of a logical device (e.g., semiconductor processor, programmable logical device), which controls first motor 112 either to simultaneously pronate left forearm 134 and extend right arm 104, or simultaneously supinate left forearm 134 and flex right arm 104. Similarly, controller controls second motor 114 either to simultaneously pronate right forearm 126 and extend left arm 106, or simultaneously supinate right forearm 126 and flex left arm 106.

It is noted that the mutual motions of right arm 104 and left forearm 134, as well as left arm 106 and right forearm 126 resemble a natural feminine motion. Alternatively, each of the right humeroscapular joint, the left humeroscapular joint, the right proximal radioulnar joint, and the left proximal radioulnar joint can be in the form of an autonomous actuator (e.g., electromechanical, hydraulic, pneumatic), whose motion is individually controlled by a controller (not shown). In this case, the first motor, the second motor, the first transmission, and the second transmission can be disposed of. Further alternatively, the controller can be coupled with each of the autonomous actuator, by a wireless link, hydraulic link, or a pneumatic link, as the case may be.

With reference to FIG. 1B, shaft 150 of second motor 114 rotates in a direction designated by an arrow 156, thereby extending left arm 106 in a direction designated by an arrow 158, and pronating right forearm 126 in a direction designated by an arrow 160. With reference to FIG. 1C, shaft 148 of first motor 112 rotates in a direction designated by an arrow 162, thereby extending right arm 104 in a direction designated by an arrow 164, and pronating left forearm 134 in a direction designated by an arrow 166. With reference to FIG. 1D, shafts 148 and 150 of first motor 112 and second motor 114, respectively, rotate in directions designated by arrows 168 and 170, respectively, to flex and extend right arm 104 in directions designated by an arrow 172, and simultaneously supinate and pronate left forearm 134, respectively, in directions designated by an arrow 174. Likewise, shafts 148 and 150 of first motor 112 and second motor 114, respectively, rotate in directions 168 and 170, respectively, to flex and extend left arm 106 in directions designated by an arrow 176, and simultaneously supinate and pronate right forearm 104, respectively, in directions designated by an arrow 178.

Figure 2:
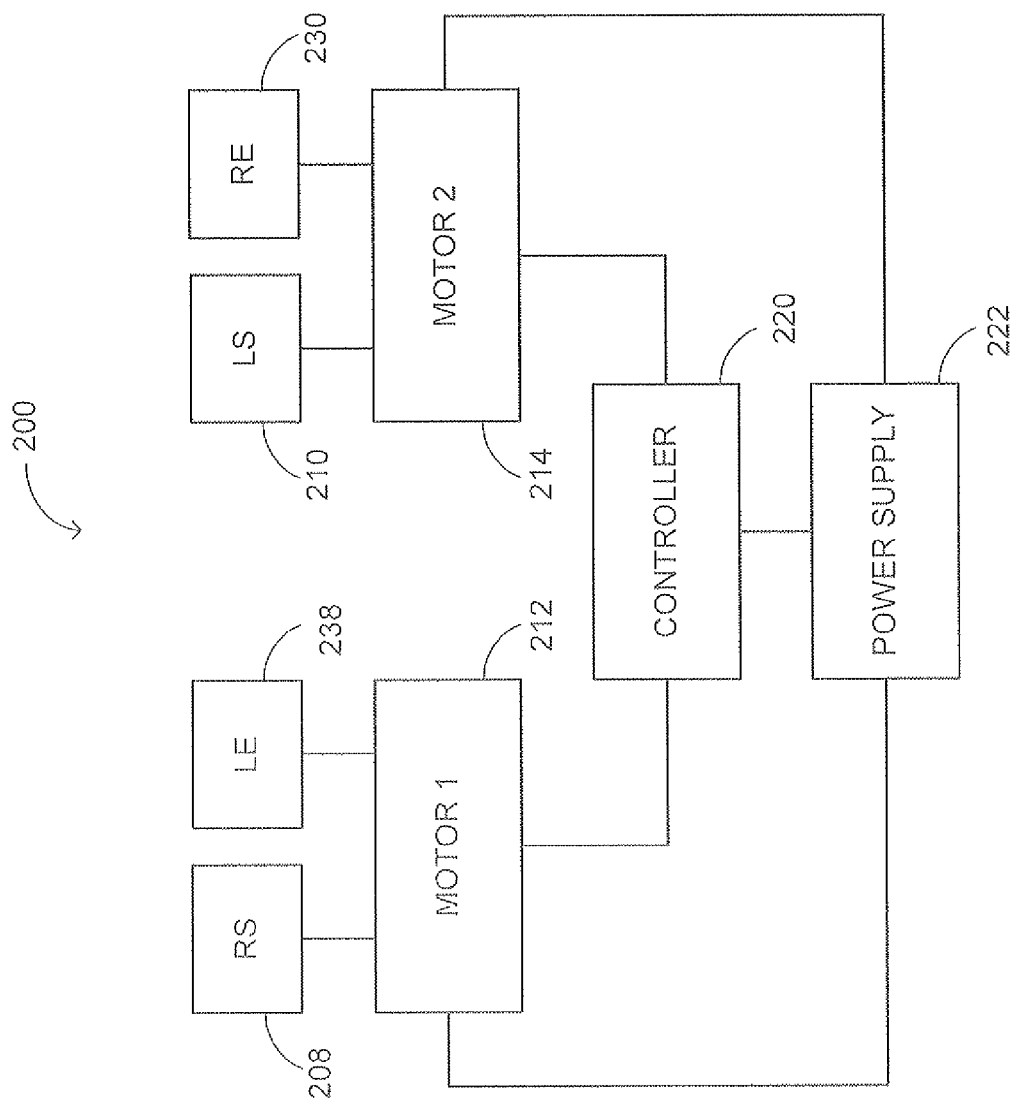
FIG. 2 is a schematic illustration of a system, for articulating the right arm, the left arm, the right forearm, and the left forearm of a robot, according to another embodiment of the disclosed technique.

Reference is now made to FIG. 2, which is a schematic illustration of a system, generally reference 200, for articulating the right arm, the left arm, the right forearm, and the left forearm of a robot, according to another embodiment of the disclosed technique. System 200 is operative to articulate, for example, the right arm, the left arm, the right forearm, and the left forearm of robot 100 (FIGS. 1A, 1B, 1C and 1D). System 200 includes a first motor 212, a second motor 214, a controller 220, a power supply 222, a right humeroscapular joint 208, a left humeroscapular joint 210, a right proximal radioulnar joint 230, a left proximal radioulnar joint 238. Controller 220 is coupled with first motor 212, second motor 214 and with power supply 222. Power supply 222 is further coupled with first motor 212 and with second motor 214. First motor 212 is further coupled with right humeroscapular joint 208 and with left proximal radioulnar joint 238. Second motor 214 is further coupled with a left humeroscapular joint 210, a right proximal radioulnar joint 230.

Controller 120 is in the form of a logical device (e.g., semiconductor processor, programmable logical device), which controls first motor 212 and second motor 214. Each of first motor 112 and second motor 114 is in the form of an actuator which produces a mechanical motion. Each of first motor 112 and second motor 114 can be in form of a rotary electromechanical motor, linear electromechanical motor, a mechanical motor (e.g., powered by a spring) hydraulic actuator, pneumatic actuator, and the like. Power supply 122 is in the form of an electrical power source, hydraulic power source, or a pneumatic power source, a mechanical power source (e.g., a spring) depending on the type of first motor 112 and second motor 114. Right humeroscapular joint 208 and Left humeroscapular joint 210 are in the form of a hinges which allows the left and right arms (not shown) respectively, to rotate. Right proximal radioulnar joint 230 Left proximal radioulnar joint 238 are also in the form of hinges allows the left and right forearms (not shown) respectively, to rotate Controller 120 provides each of motor 212 and 214 with instructions (e.g., digital signals) regarding the direction and duration of the rotation of each of first motor 212 and second motor 214. First motor 212 rotates right humeroscapular joint 208 and Left proximal radioulnar joint 238 according to these instructions. Thus, first motor 212 rotates right arm and left forearm simultaneously. Second motor 214 rotates Left humeroscapular joint 210 and Right proximal radioulnar joint 238 according to the instructions provided by controller 220. Thus, first motor 212 rotates left arm and right forearm simultaneously. It is noted that the rate of rotation of left arm and right forearm are not necessarily the same. Likewise the rate of rotation of right arm and left forearm are not necessarily the same. The difference between the rates of rotations may be achieved with a gear boxes and transmissions (not shown).

Figure 3:
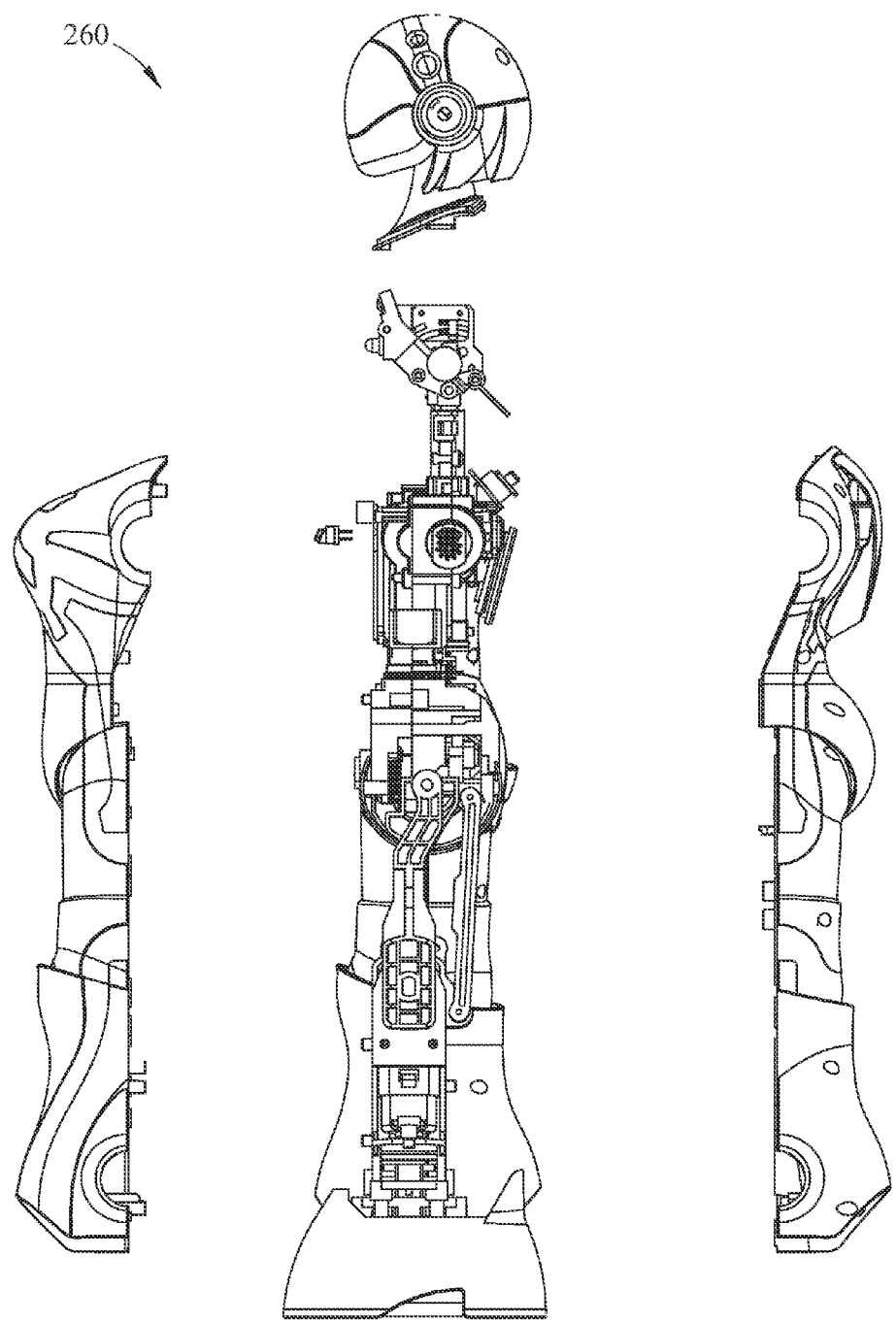
FIG. 3 is a schematic illustration of a cross section side view of a bi-pedal locomotive robot, constructed and operative in accordance with a further embodiment of the disclosed technique.
Figure 4:
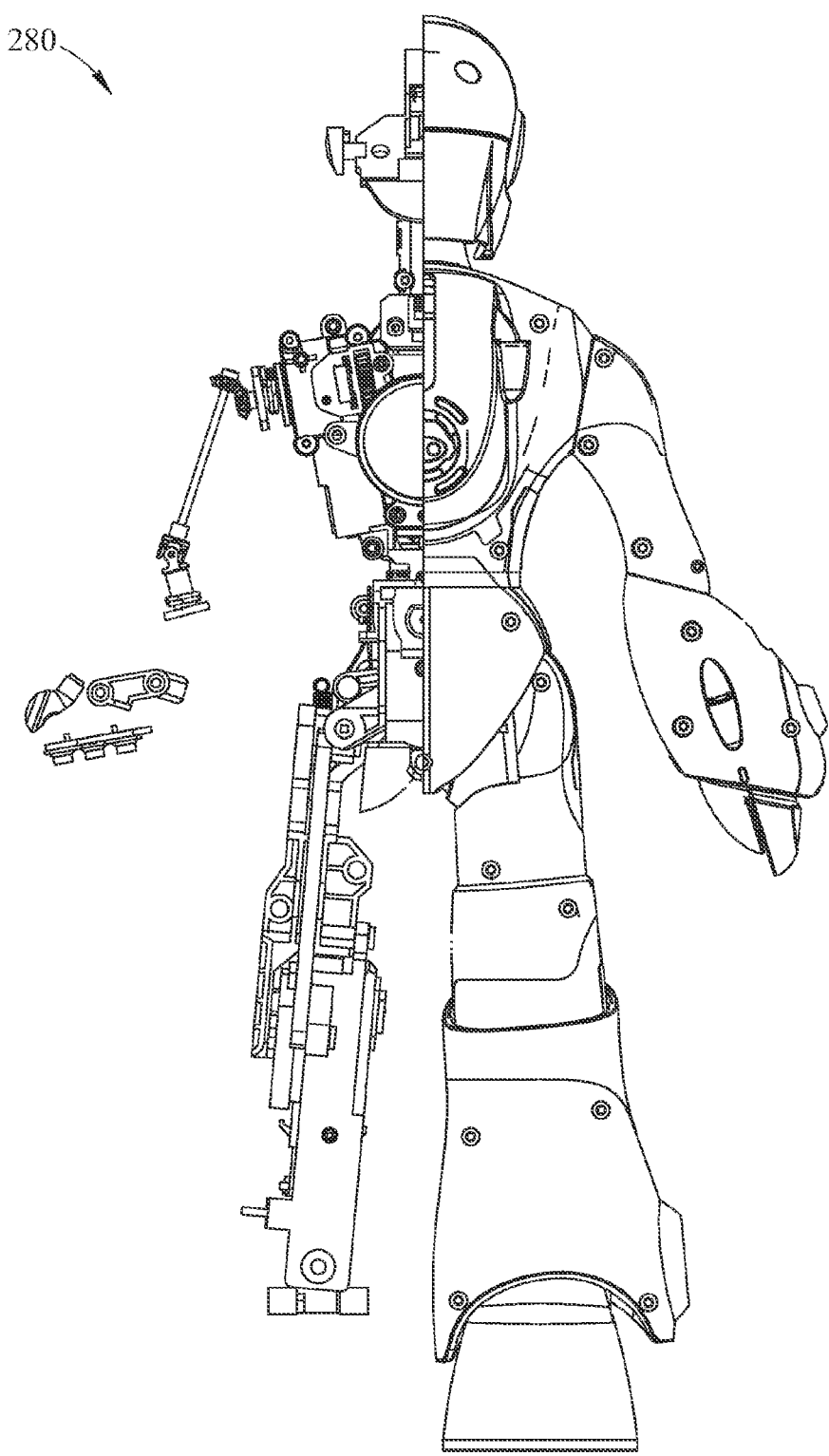
FIG. 4 is a schematic illustration of a rear view of the bi-pedal locomotive robot of FIG. 3, in which the right side is an external view and the left side is a view of the internal parts, constructed and operative in accordance with another embodiment of the disclosed technique.

Reference is now made to FIGS. 3, 4, 5, 6, 7, 8, 9, 10, 11, and 12. FIG. 3 is a schematic illustration of a cross section side view of a bi-pedal locomotive robot, generally referenced 260, constructed and operative in accordance with a further embodiment of the disclosed technique. FIG. 4 is a schematic illustration of a rear view of the bi-pedal locomotive robot 260 of FIG. 3, in which the right side is an external view and the left side is a view of the internal parts, constructed and operative in accordance with another embodiment of the disclosed technique.

Figure 5:
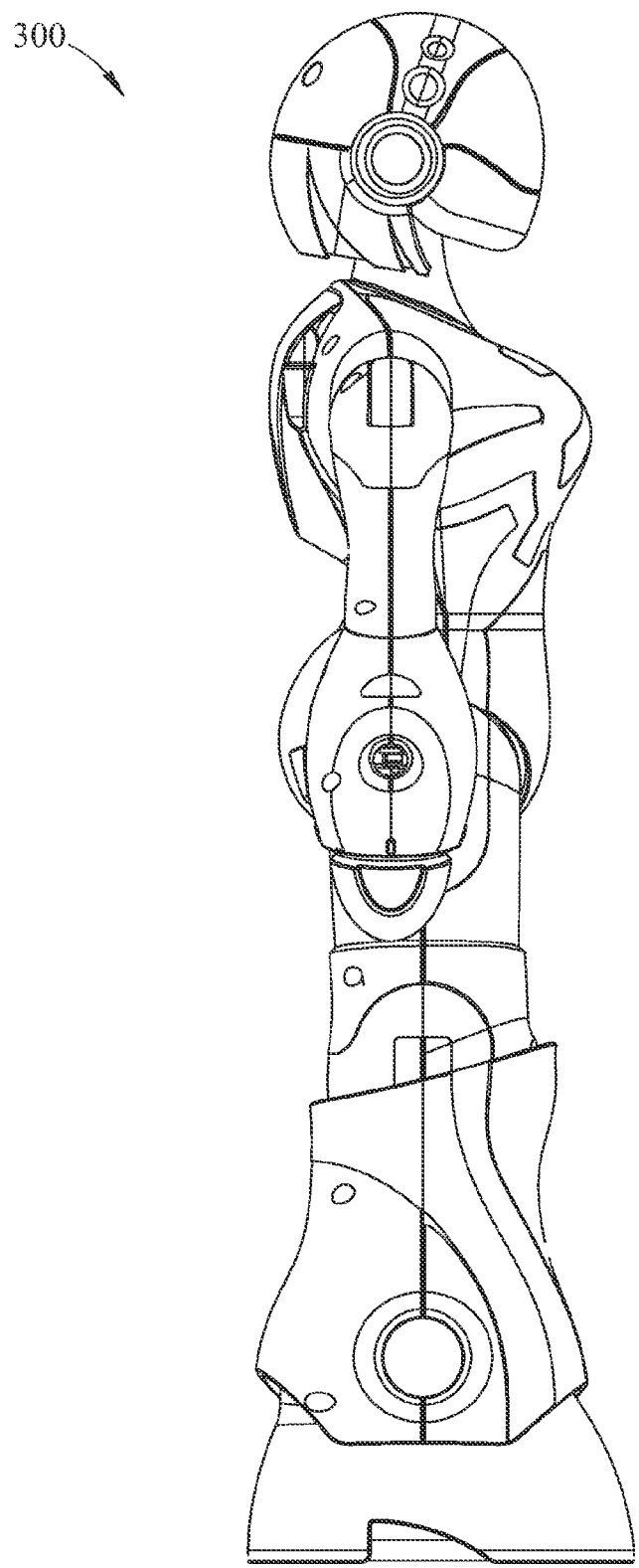
FIG. 5 is a schematic illustration of an external side view of the bi-pedal locomotive robot of FIG. 3, constructed and operative in accordance with a further embodiment of the disclosed technique.
Figure 6:
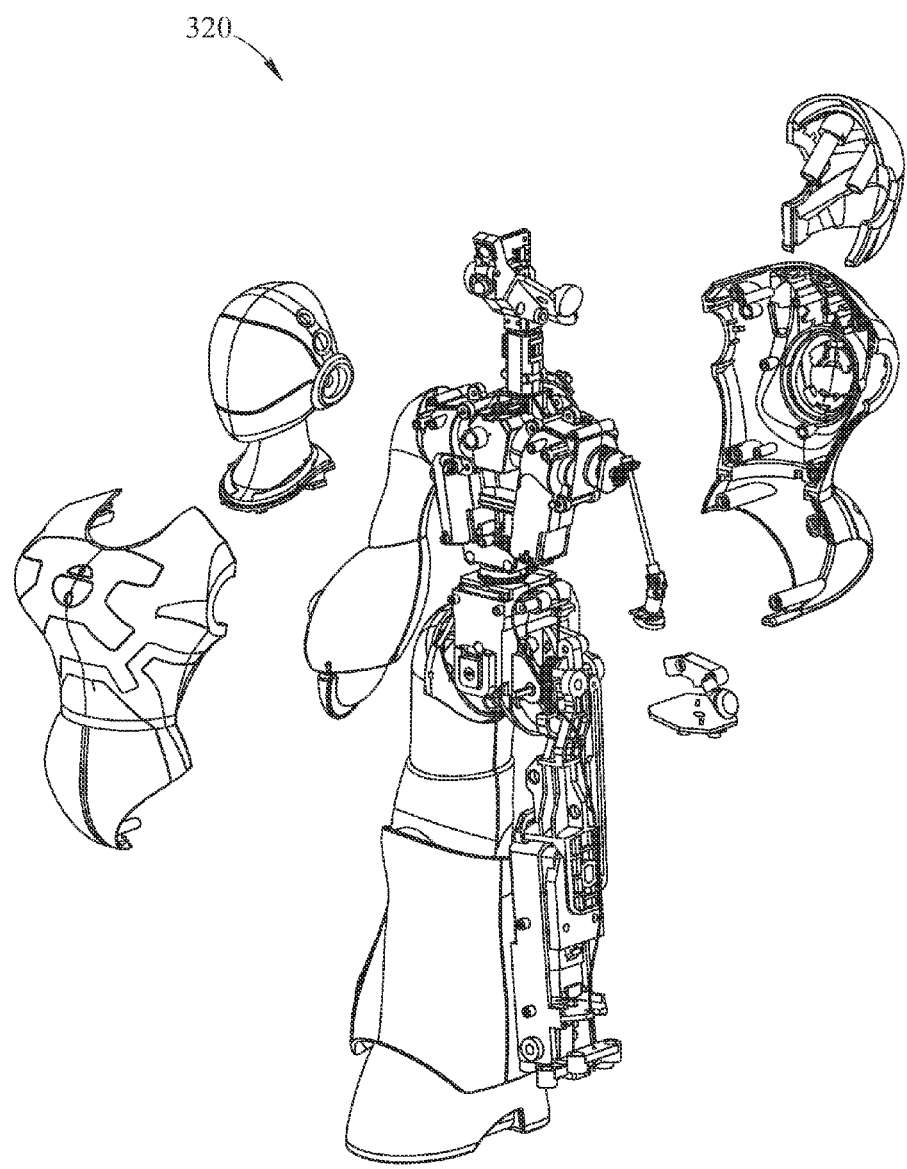
FIG. 6 is a schematic illustration of an isometric view of the bi-pedal locomotive robot of FIG. 3, in which the right side is a view of the internal parts and the left side is an external view, constructed and operative in accordance with another embodiment of the disclosed technique.

FIG. 5 is a schematic illustration of an external side view of the bi-pedal locomotive robot 260 of FIG. 3, constructed and operative in accordance with a further embodiment of the disclosed technique. FIG. 6 is a schematic illustration of an isometric view of the bi-pedal locomotive robot 260 of FIG. 3, in which the right side is a view of the internal parts and the left side is an external view, constructed and operative in accordance with another embodiment of the disclosed technique.

Figure 7:
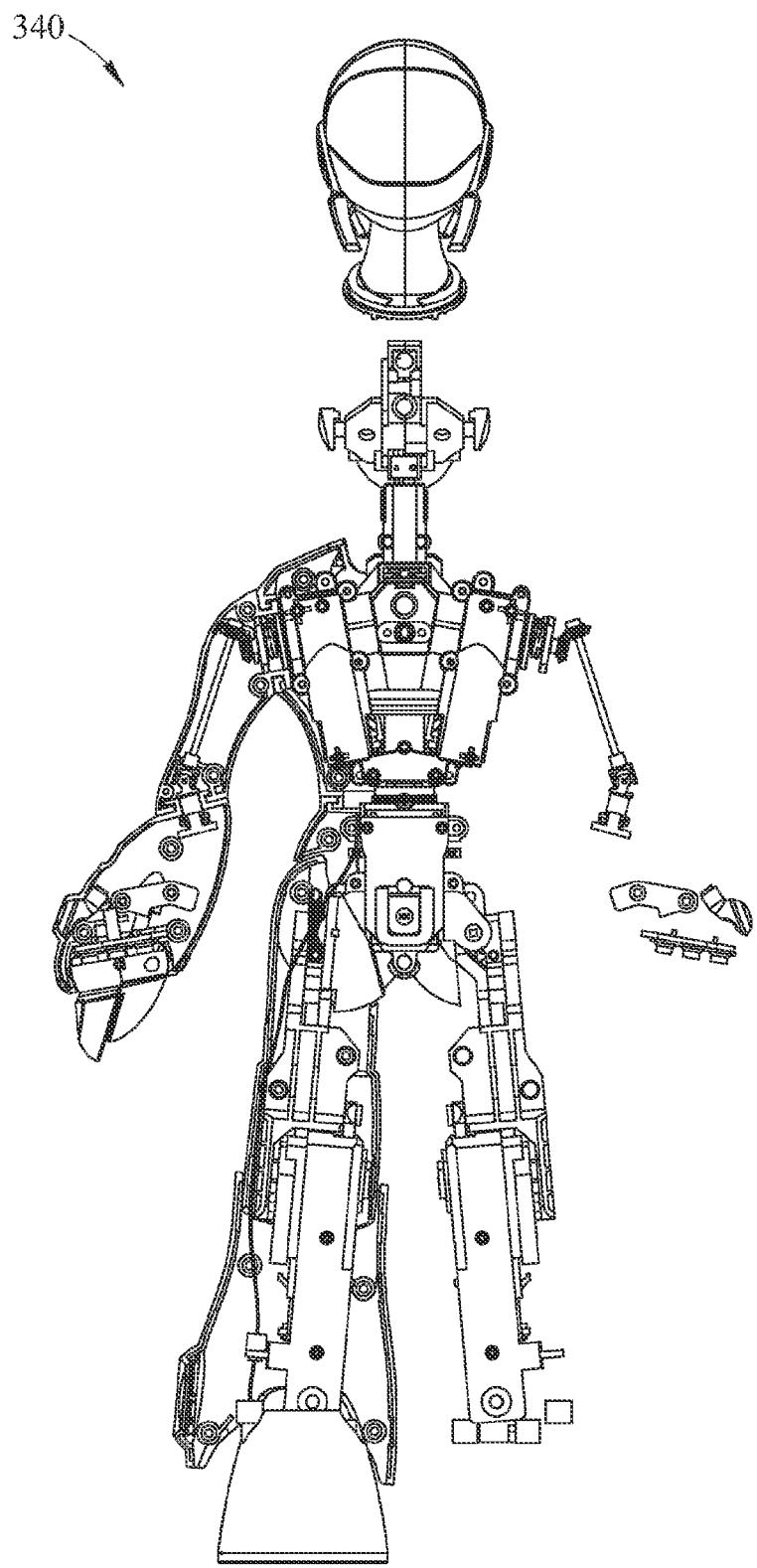
FIG. 7 is a schematic illustration of a rear view of the bi-pedal locomotive robot of FIG. 3, in which the right side is a view of the internal parts and the left side is a cross section view, constructed and operative in accordance with a further embodiment of the disclosed technique.
Figure 8:
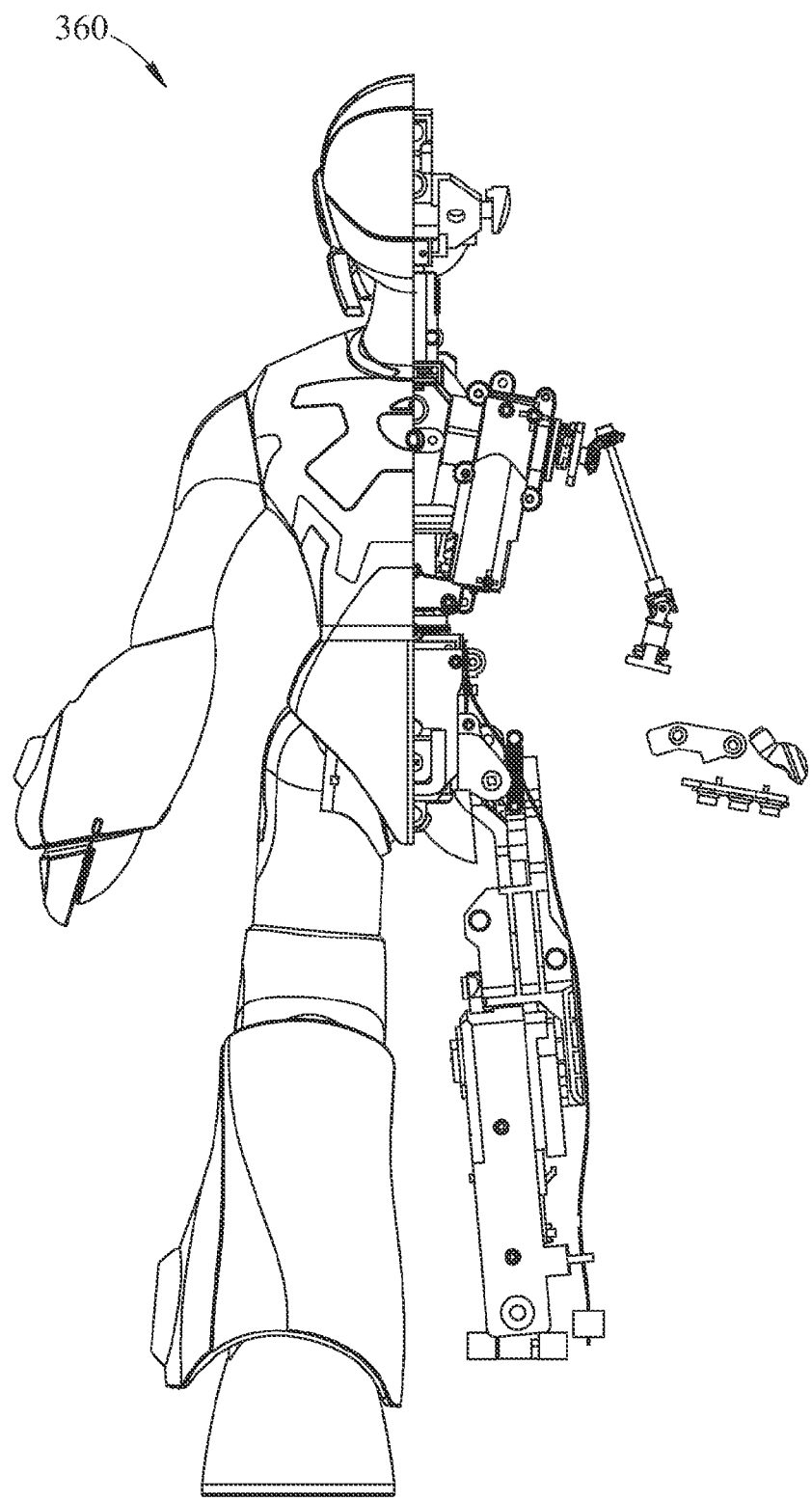
FIG. 8 is a schematic illustration of a front view of the bi-pedal locomotive robot of FIG. 3, in which the right side is a view of the internal parts and the left side is an external view, constructed and operative in accordance with another embodiment of the disclosed technique.

FIG. 7 is a schematic illustration of a rear view of the bi-pedal locomotive robot 260 of FIG. 3, in which the right side is a view of the internal parts and the left side is a cross section view, constructed and operative in accordance with a further embodiment of the disclosed technique. FIG. 8 is a schematic illustration of a front view of the bi-pedal locomotive robot 260 of FIG. 3, in which the right side is a view of the internal parts and the left side is an external view, constructed and operative in accordance with another embodiment of the disclosed technique.

Figure 9:
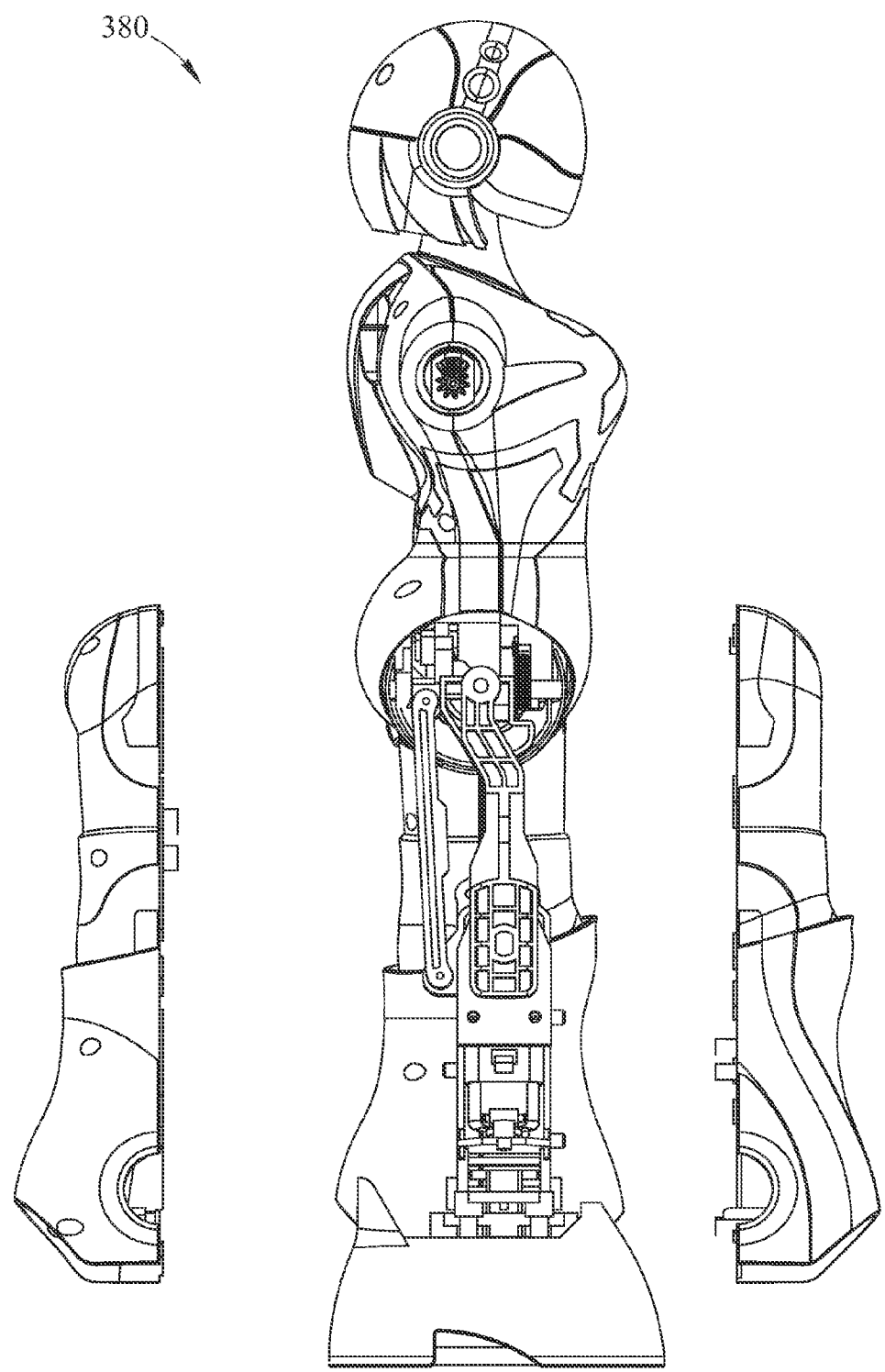
FIG. 9 is a schematic illustration of a side view of the bi-pedal locomotive robot of FIG. 3, in which the leg is in a cross section view, constructed and operative in accordance with a further embodiment of the disclosed technique.
Figure 10:
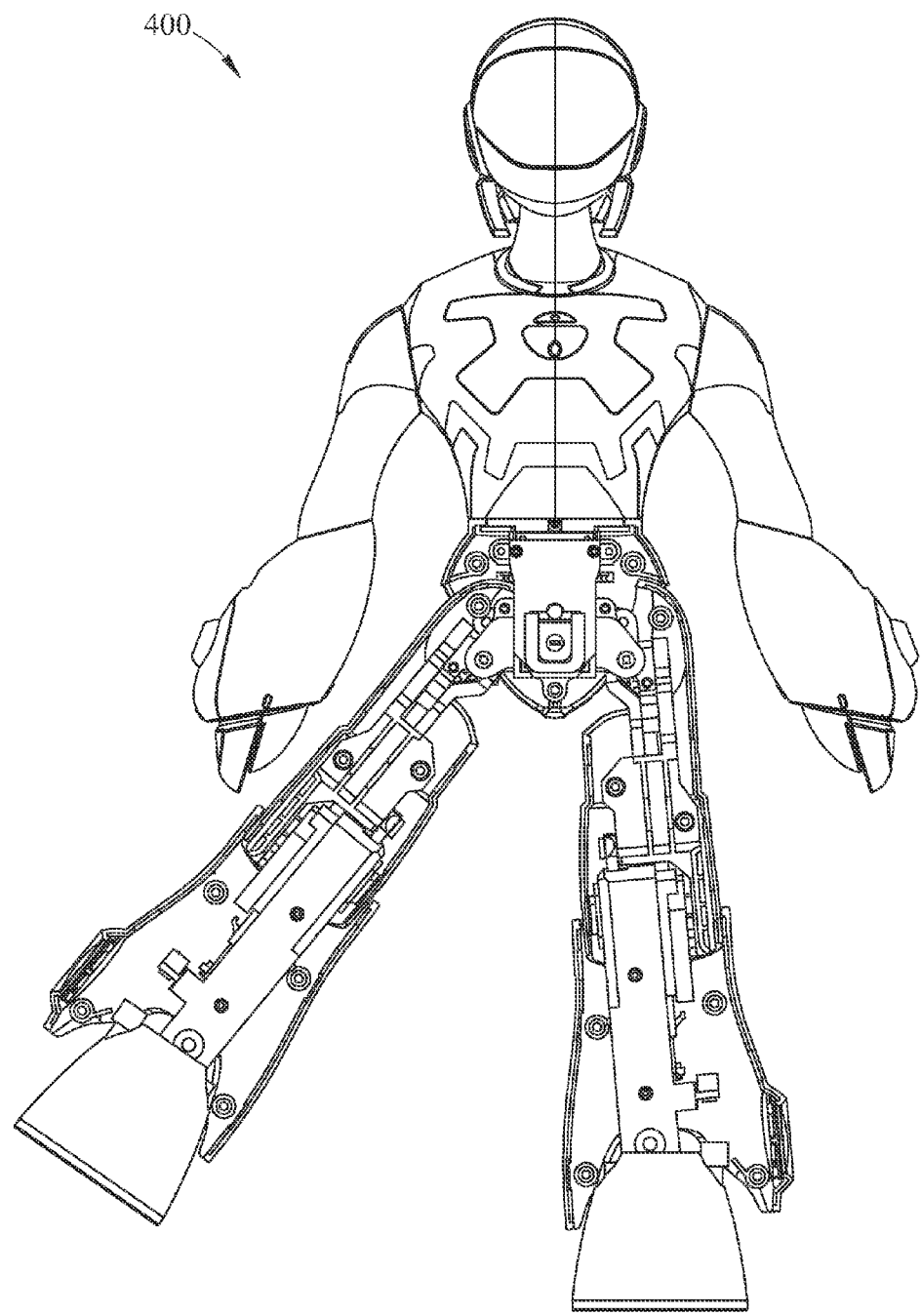
FIG. 10 is a schematic illustration of a front view of the bi-pedal locomotive robot of FIG. 3, in which the legs are in a cross section view and the torso and head are in an external view, constructed and operative in accordance with another embodiment of the disclosed technique.

FIG. 9 is a schematic illustration of a side view of the bi-pedal locomotive robot 260 of FIG. 3, in which the leg is in a cross section view, constructed and operative in accordance with a further embodiment of the disclosed technique. FIG. 10 is a schematic illustration of a front view of the bi-pedal locomotive robot 260 of FIG. 3, in which the legs are in a cross section view and the torso and head are in an external view, constructed and operative in accordance with another embodiment of the disclosed technique.

Figure 11:
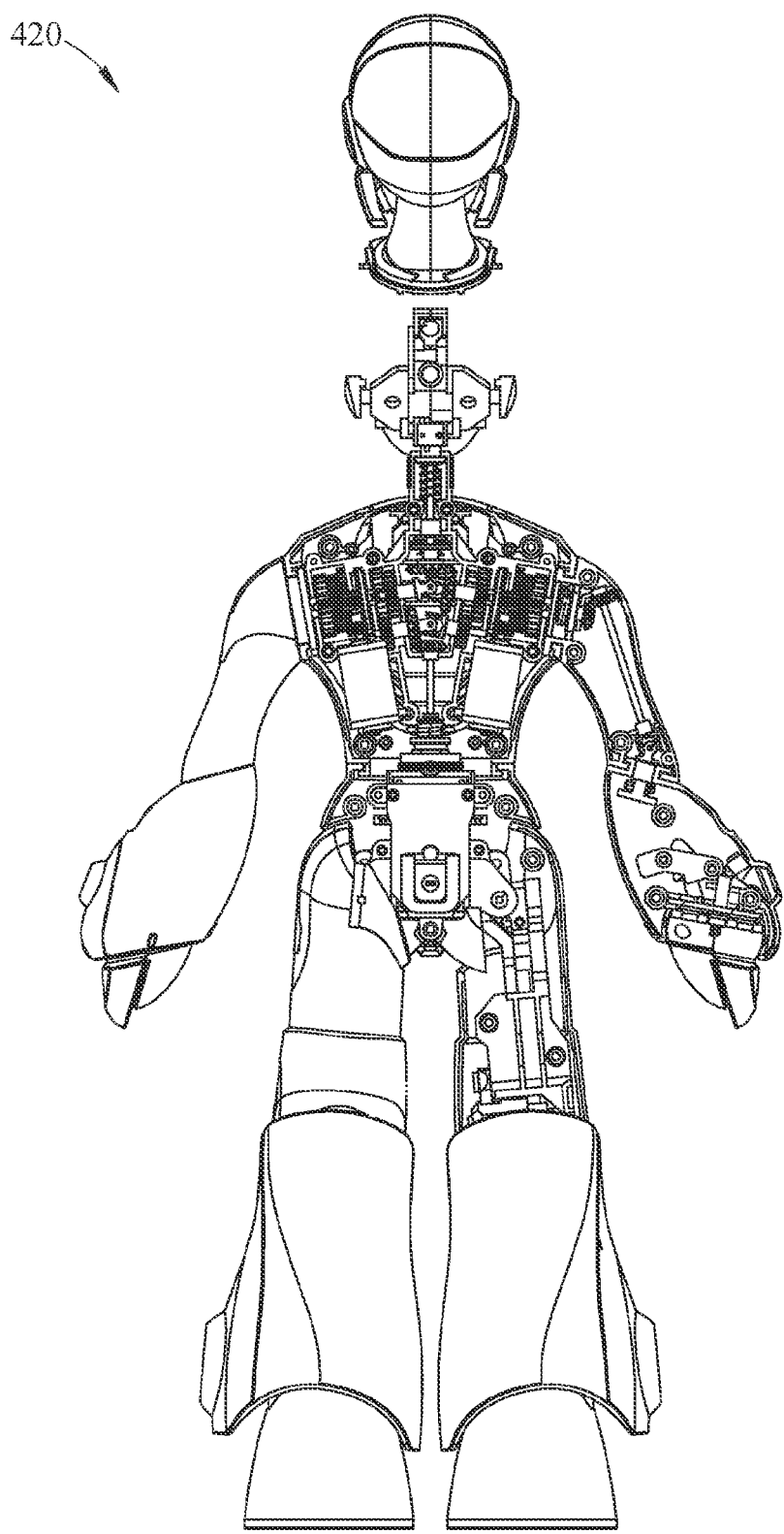
FIG. 11 is a schematic illustration of a front view of the bi-pedal locomotive robot of FIG. 3, in which the left leg and left arm are in an external view and the rest of the body is in a cross section view, constructed and operative in accordance with a further embodiment of the disclosed technique.
Figure 12:
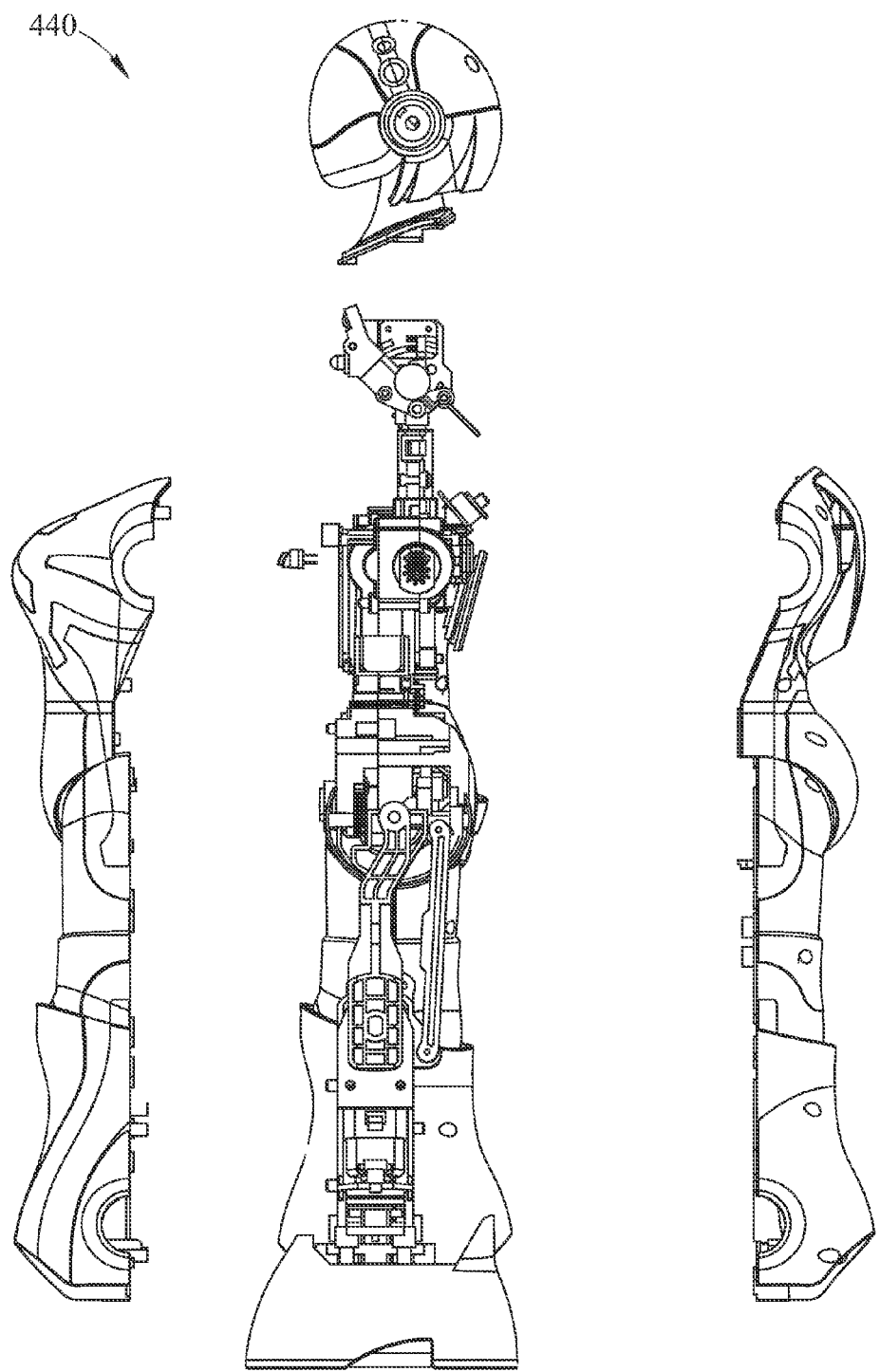
FIG. 12 is a schematic illustration of a cross section of a side view of the bi-pedal locomotive robot of FIG. 3, constructed and operative in accordance with another embodiment of the disclosed technique.

FIG. 11 is a schematic illustration of a front view of the bi-pedal locomotive robot 260 of FIG. 3, in which the left leg and left arm are in an external view and the rest of the body is in a cross section view, constructed and operative in accordance with a further embodiment of the disclosed technique. FIG. 12 is a schematic illustration of a cross section of a side view of the bi-pedal locomotive robot 260 of FIG. 3, constructed and operative in accordance with another embodiment of the disclosed technique. It will be appreciated by persons skilled in the art that the disclosed technique is not limited to what has been particularly shown and described hereinabove. Rather the scope of the disclosed technique is defined only by the claims, which follow.

The invention claimed is:

1. Mechanism for articulating a right arm, a left arm, a right forearm, and a left forearm of a humanoid, the right arm being coupled with a torso of the humanoid, by a right humeroscapular joint, the left arm being coupled with the torso, by a left humeroscapular joint, the right forearm being coupled with a right humerus of the right arm, by a right proximal radioulnar joint, the left forearm being coupled with a left humerus of the left arm, by a left proximal radioulnar joint, the right humeroscapular joint providing flexion and extension of the right arm, the left humeroscapular joint providing flexion and extension of the left arm, the right proximal radioulnar joint providing supination and pronation of the right forearm, the left proximal radioulnar joint providing supination and pronation of the left forearm, the mechanism comprising:

a first transmission located within said humanoid;
a second transmission located within said humanoid;
a first actuator located within said humanoid, said first actuator being coupled with said right humeroscapular joint, and with said left proximal radioulnar joint, via said first transmission, said first actuator extending said right arm while supinating said left forearm, said first actuator flexing said right arm while pronating said left forearm;
a second actuator located within said humanoid, said second actuator being coupled with said left humeroscapular joint, and with said right proximal radioulnar joint, via said second transmission, said second actuator extending said left arm while supinating said right forearm, said second actuator flexing said left arm while pronating said right forearm; and
a power supply coupled with said first actuator, said second actuator, and with said controller, said power supply providing power to said first actuator, and to said second actuator.

2. The articulating mechanism of claim 1, further comprising a controller coupled with said first actuator and with said second actuator, said controller controlling the movements of each of said first actuator and of said second actuator.

3. The articulating mechanism of claim 1, wherein said first actuator rotates said right arm and rotates said left forearm in an equal rotation rate by employing said first transmission.

4. The articulating mechanism of claim 1, wherein said first actuator rotates said right arm and rotates said left forearm in a differential rotation rate by employing said first transmission.

5. The articulating mechanism of claim 1, wherein said second actuator rotates said left arm and rotates said right forearm in an equal rotation rate by employing said first transmission.

6. The articulating mechanism of claim 1, wherein said second actuator rotates said left arm and rotates said right forearm in a differential rotation rate by employing said first transmission.

7. Mechanism for articulating a right arm, a left arm, a right forearm, and a left forearm of a humanoid, the right arm being coupled with a torso of the humanoid, by a right humeroscapular joint, the left arm being coupled with the torso, by a left humeroscapular joint, the right forearm being coupled with a right humerus of the right arm, by a right proximal radioulnar joint, the left forearm being coupled with a left humerus of the left arm, by a left proximal radioulnar joint, the right humeroscapular joint providing flexion and extension of the right arm, the left humeroscapular joint providing flexion and extension of the left arm, the right proximal radioulnar joint providing supination and pronation of the right forearm, the left proximal radioulnar joint providing supination and pronation of the left forearm, the mechanism comprising:

a first actuator located within said humanoid, said first actuator being coupled with said right humeroscapular joint;
a second actuator located within said humanoid, said second actuator being coupled with said left proximal radioulnar joint;

a third actuator located within said humanoid, said third actuator being coupled with said left humeroscapular joint;

a fourth actuator located within said humanoid, said fourth actuator being coupled with said right proximal radioulnar joint;

a controller coupled with said first actuator, said second actuator, said third actuator and with said fourth actuator, for simultaneously operating said first actuator with said second actuator, and for simultaneously operating said third actuator with said fourth actuator; and a power supply coupled with said first actuator, said second actuator, said third actuator and with said fourth actuator, said power supply providing power to said first actuator, said second actuator, said third actuator and said fourth actuator.

\* \* \* \* \*